Figure 3:
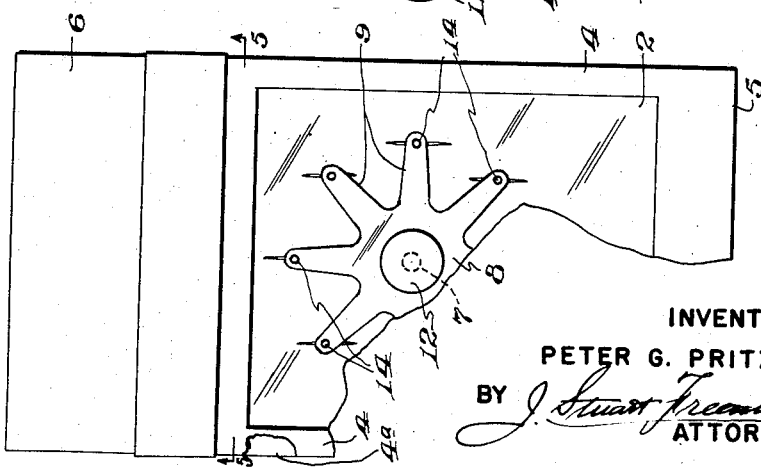

Oct. 14, 1958

P. G. PRITZ 2,855,842

ELECTRIC FOOD BROILERS

Filed May 25, 1955

5 Sheets-Sheet 1

INVENTOR
PETER G. PRITZ
BY J. Stuart Freeman
ATTORNEY

Oct. 14, 1958

P. G. PRITZ 2,855,842

ELECTRIC FOOD BROILERS

Filed May 25, 1955

5 Sheets-Sheet 2

INVENTOR
PETER G. PRITZ
BY
ATTORNEY

Oct. 14, 1958
P. G. PRITZ
2,855,842
ELECTRIC FOOD BROILERS
Filed May 25, 1955
5 Sheets-Sheet 4
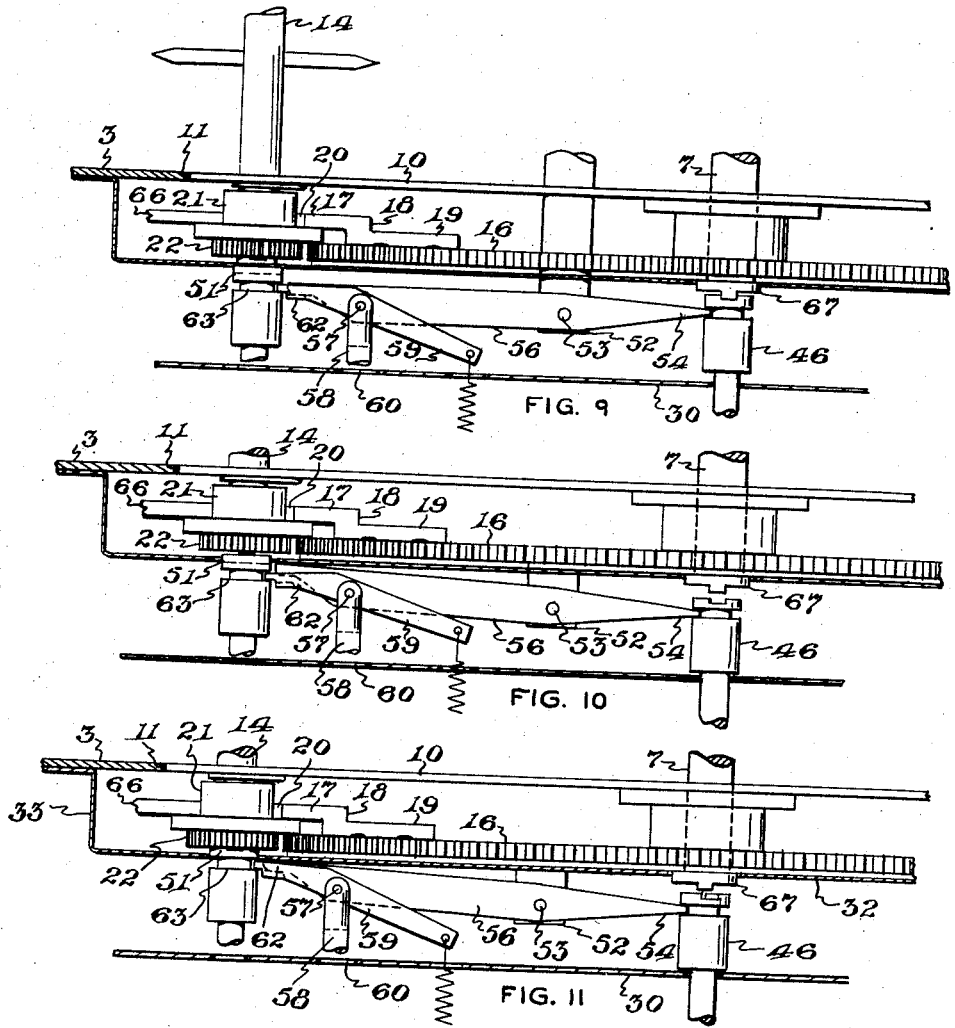
INVENTOR
PETER G. PRITZ
BY
ATTORNEY Oct. 14, 1958    P. G. PRITZ    2,855,842
ELECTRIC FOOD BROILERS Filed May 25, 1955    5 Sheets-Sheet 5

INVENTOR
PETER G. PRITZ
BY
ATTORNEY

United States Patent Office 2,855,842
Patented Oct. 14, 1958

2,855,842

ELECTRIC FOOD BROILERS

Peter G. Pritz, Jenkintown, Pa.

Application May 25, 1955, Serial No. 510,886

8 Claims. (Cl. 99—421)

The object of the invention is to provide improvements in food broilers broadly speaking, but more particularly in the rotary type in which the substances being broiled are continuously revolved about their individual axes in what will be referred to as a planetary orbit or path about a common axis, whereby the individual pieces or units of such edible substances are repeatedly subjected upon all sides to the direct action of the heat emanating by direct radiation, as well as by convection and normal circulation, from relatively stationary electrically energized resistance units.

The new device was initially designed to effectively handle the rapidly increasing taste and resulting demand for broiled frankfurters or sausages, widely referred to as hot-dogs, but all use hereinafter of one or another of those terms is to be understood as being intended to apply equally to whatever articles or objects, that the device may be capable of handling, even to the drying and/or polymerization of certain inks, glazes, enamels and other coatings, or compositions, that are either or both dried and set by the action of heat rays, whether of longer or shorter ranges in the thermal spectrum.

Another object is to provide a device of this nature, which essentially comprises at least one revolvable disk, at least one auxiliary support carried by said disk and revolvable about an axis that is parallel with but spaced from that of said disk, means to detachably secure a frankfurter to said support, a fixed annular rack to impart planetary motion to said support during its normal orbital movement about the axis of said disk, while said support and said disk are in operative engagement, and means to regularly disengage said support from said rack through a limited segmental portion of its normal planetary orbit, during which time broiled frankfurters may be removed from, and fresh frankfurters attached to, such support.

A further object is to provide in such a device an improved clutch mechanism, whereby during the so-called slack periods of both day and night, the broiler as a composite unit of several of said supports may have its broiling capacity limited to but a single such support (or a pair or more of said supports), by directly revolving such support from the driving motor, while the normally revolvable disk is disconnected therefrom during the period that such support is lifted from engagement with said rack.

Still another object is to provide in a device of this class a direct mounting or support for the frankfurters, such that with a relatively slow motion of the indirect rotary supporting disk a relatively faster rotary motion of each frankfurter is affected and insured, towards the end of causing the automatic basting of each frankfurter independently of any others being concurrently treated, and with the highly desirable result that not a single drop of the juices of the frankfurter is lost, while guaranteeing the retention of maximum flavor and gastronomic deliciousness.

Figure 2:
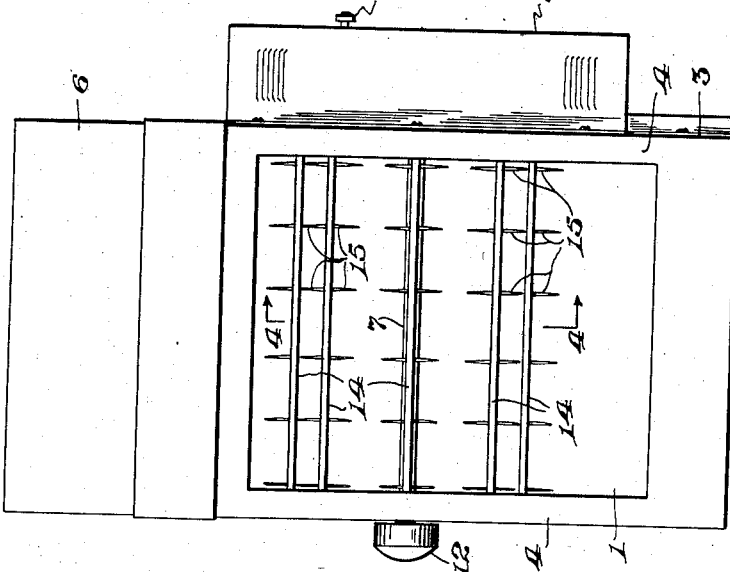
Figure 1:
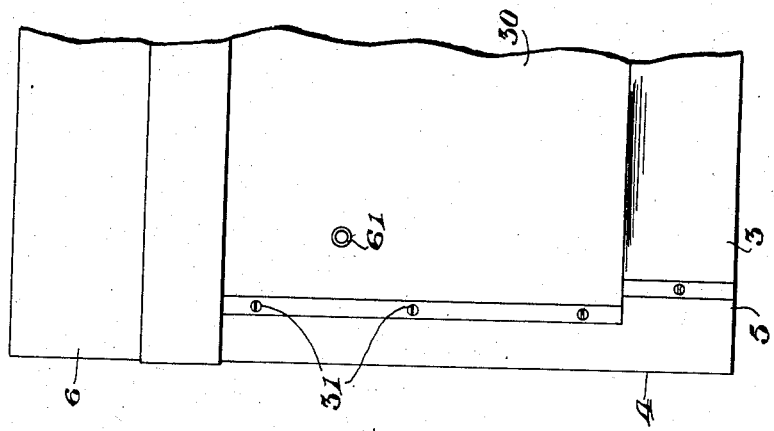
Figure 4:
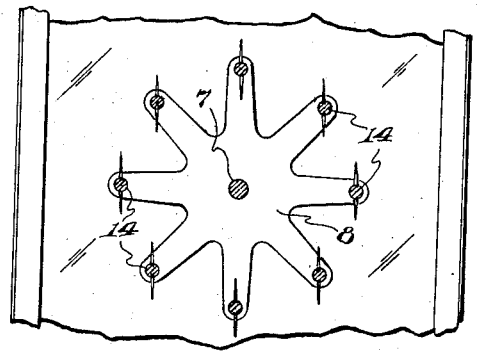
Figure 5:
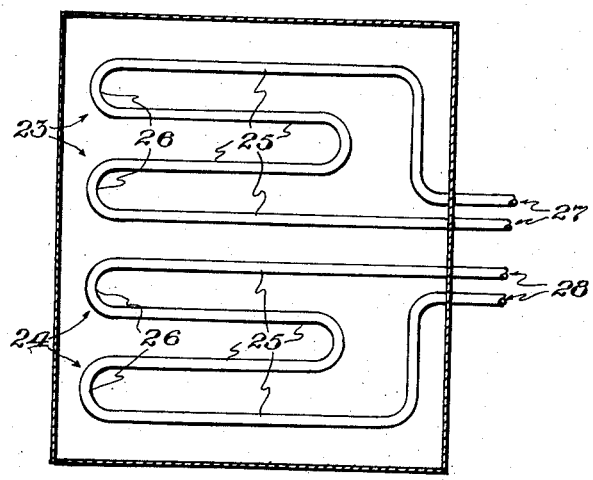
Figure 6:
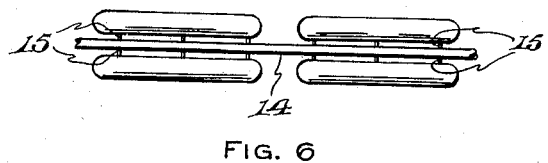
Figure 8:
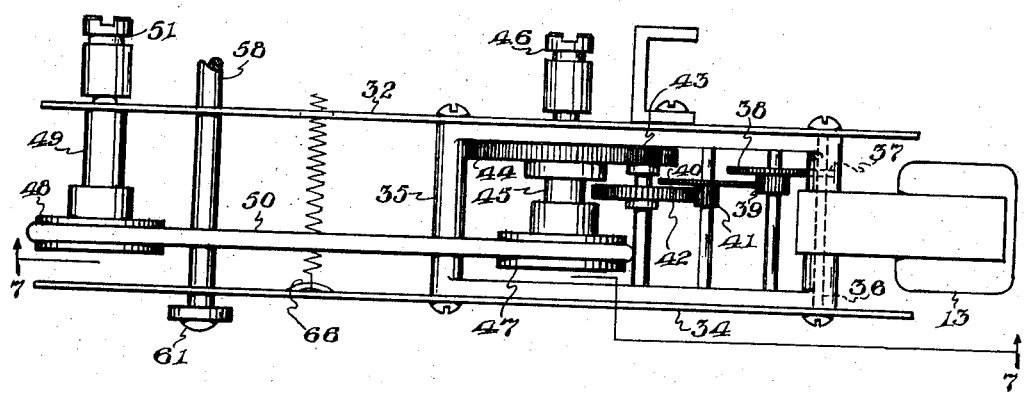
Figure 7:
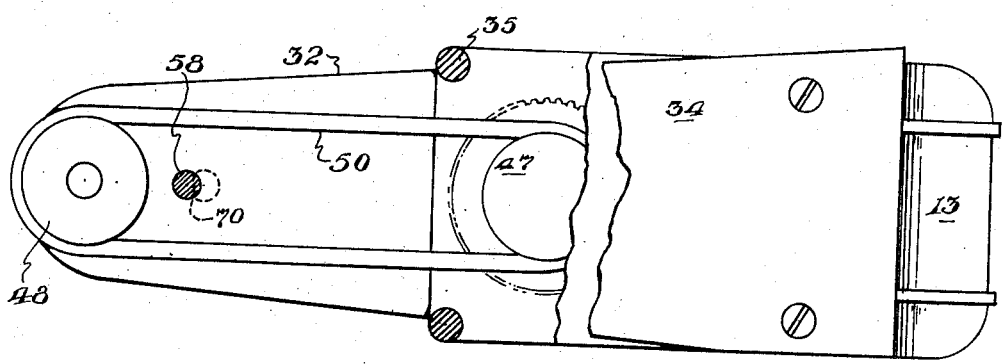
Figure 12:
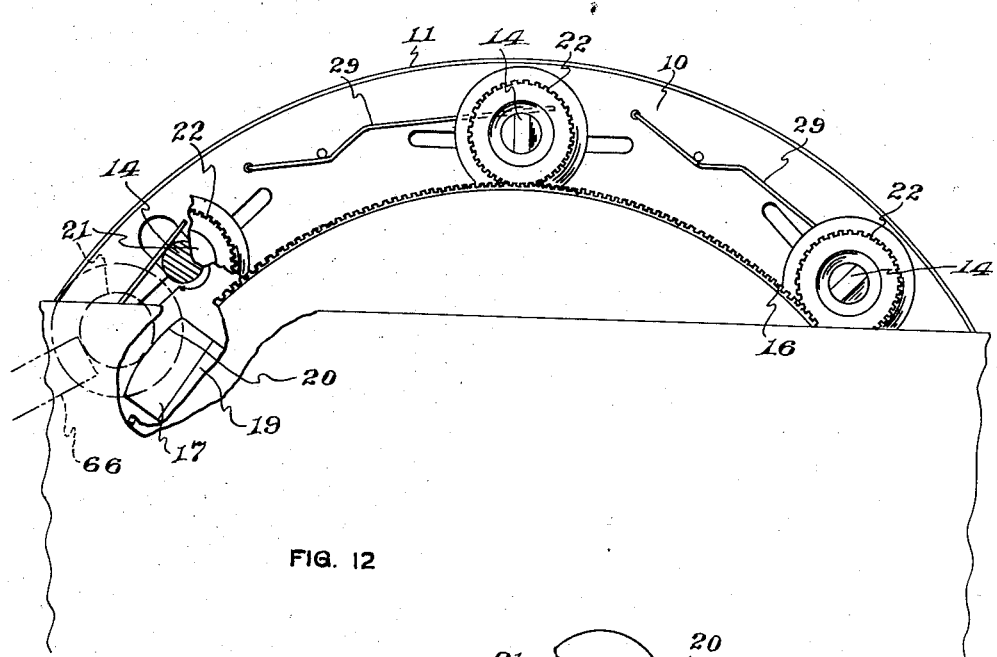
Figure 13:
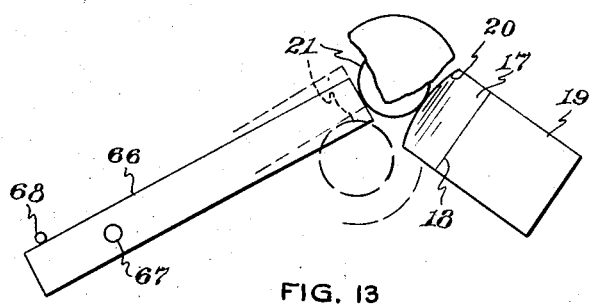

With the objects thus briefly and broadly stated, the invention comprises further details of construction and operation, which are hereinafter fully brought out in the following description, when read in conjunction with the accompanying drawings, in which Fig. 1 is a left side elevation of a broiler comprising one embodiment of the invention; Fig. 2 is a front elevation of the same; Fig. 3 is a right hand elevation of the same; Fig. 4 is a vertical fragmentary section on the line 4—4 of Fig. 2; Fig. 5 is a horizontal section on the line 5—5 of Fig. 1; Fig. 6 is a fragmentary front elevation, showing a single rotary broiling spit upon which four hot dogs, sausages, or frankfurters are mounted when being broiled; Fig. 7 is a side elevation of a fragmentary portion of the device on the line 7—7 of Fig. 8 and with parts broken away to show the driving connection between the shaft of the primary squirrel cage rotary unit as a whole and one of its auxiliary sausage supporting units; Fig. 8 is a right side elevation of the same, and also showing the motor and the reduction gearing by which it drives said primary unit, and said auxiliary unit through a connecting belt or the like; Figs. 9, 10 and 11 are fragmentary sections showing three sequential positions and relationships of the primary and one of the auxiliary units, also the clutch mechanism by which the second may be temporarily disengaged from rotating with the first; Fig. 12 is a fragmentary view showing the normal intermeshing engagement of the rack and pinion driving means, that normally connect the said primary and auxiliary units; and Fig. 13 is a fragment view showing the gravity drop that arrests the backward rotation of an auxiliary unit with respect to said primary unit when they are out of mesh, and ready to have sausage placed on or removed from them.

Referring first to Figs. 1, 2, 3, 4 and 5, one embodiment of the invention is shown as comprising a lower chamber having an open front 1 (Fig. 2), a left-hand side glass panel 2 (Fig. 1), a sheet metal righthand wall 3 (Fig. 3), and metallic corner angles 4 connecting and fixedly positioning said panel walls, the rear wall 4a being either of glass to permit the operator to better view the articles being broiled, or opaque if preferred. The bottom of said chamber is closed by a bottom wall 5, while the top is preferably covered by a suitable hollow closure 6, in which uncooked sausage or the like may be warmed, while protected from the surrounding dust-laden atmosphere.

Within said broiling chamber and revolvably supported by and between the opposite side walls 2 and 3 is a central shaft 7, to the opposite ends of which (within said chamber) are secured a spider 8 having angularly related radial arms 9 on the left end and a circular disk 10 on the right end, said disk being rotatable within an opening 11 in the side walls 3. Said shaft is manually rotatable from the left side by means of a knob 12 upon the outside of the lefthand transparent wall panel 2, while the opposite or righthand end of said shaft is normally rotated by a motor 13, as hereinafter described. Extending between the arms of said spider and said disk are a plurality of auxiliary shafts 14, each of which is provided with a plurality of longitudinally spaced pairs of radially projecting pins or sharpened spikes 15, upon which sausage or so-called hot-dogs 15 are impaled, as shown in Fig. 6, parallel with said auxiliary shafts. By this means of mounting them, the sausages revolve about the axis of said auxiliary shafts, while these auxiliary shafts normally revolve about the common axis of the main shaft 7, in what is generally known as a planetary motion or orbit.

Said main shaft and its spider on one end and disk on the other, together with said auxiliary shafts, pins and sausage, or other food articles carried thereby, revolve with respect to a fixedly positioned circular rack 16, to one side of which is secured an angular arm 17 that by means of a central angular portion 18 is secured at 19 to that portion of one side of the periphery of said rack that is most accessible to an operator, who when standing in front of the device can easily reach it through the open front of the device, and insert fresh or remove broiled frankfurters without difficulty. The outer free end of said arm comprises an anvil having a fixed cam surface 20, which projects radially outwardly beyond the limits of said rack, and is successively engaged by a disk 21 upon each of said auxiliary shafts, so as to lift from meshing engagement with said rack the respective gears 22 with which each of said auxiliary shafts is provided. Thus, when each of said auxiliary shafts in turn is encountered by said anvil and its cam surface, its gear is lifted from engagement with said rack, and the particular auxiliary shaft in that position ceases to revolve, and thereby affords the operator a chance to remove from and/or replace upon such shaft as many fresh sausages or hot-dogs as may be desired and which it will accommodate, while the remaining auxiliary shafts with their supported sausages continue to revolve in broiling proximity to the heating units 23 and 24. Each of said heating units comprises a series of parallel electric resistance bars or rods 25 and connecting U-shaped bends or connections 26, together with suitable control connections not shown but indicated by the pairs of terminals 27 and 28. Normally each of said auxiliary shafts has its gear maintained in intermeshing engagement with said rack by a suitable spring 29, which may be of any desired shape and arrangement, and which springs are carried by the disk 10.

Referring to Figs. 7 and 8, there is provided a casing for the driving mechanism, said casing essentially comprising an outer wall 30 (Fig. 3), that is removably secured to the righthand wall 3 by means of screws or the like 31; also an inner wall 32 that is supported by the side wall 3 but spaced therefrom by a peripheral flange 33; and an intermediate plate 34. Between said inner wall and said plate is secured a preferably cast frame 35, to one end of which is secured the electric motor 13. This motor normally revolves a shaft 36 provided with a pinion 37, which meshes with a series of reduction gears 38—39, 40—41, 42—43, said last mentioned being a pinion (43) that meshes with a much larger gear 44 carried by a shaft 45, that also carries upon its inner end a clutch 46, adapted to normally engage and rotate the shaft 7 of the squirrel cage, while the opposite end of said shaft 45 is provided with a pulley 47. Between this pulley and a similar pulley 48 carried by an auxiliary shaft 49 is a flexible driving belt 50, upon the outer end of which is a clutch 51, that is adapted to mesh with any one of said auxiliary shafts 14, when in the cam-engaging position shown in Fig. 11.

Referring now to Figs. 9, 10 and 11, between the walls 30 and 32 and carried by the latter is a post or stud 52, to which is pivotally secured an intermediate portion of a rocking lever 53, one end 54 of which slidably engages within a slot 55 in the clutch 46, while the opposite end 56 of said lever pivotally carries at 57 two elements, namely, the inner end of a manually actuatable rod 58 and the central portion of an auxiliary lever 59. Said rod extends outwardly through an aperture 60, and is provided upon its outer free end with a manually engageable knob 61, while one end 62 of said last mentioned lever enters slidably into and engages the sides of a slot 63 in the clutch member 51, while the opposite end 64 of said lever is connected by means of a spring 65 to any suitable portion 66 of said intermediate plate 34. Said spring thus tends to force the clutch 51 inwardly into operative engagement with that one of said auxiliary shafts that may be in alignment therewith. However, by manually pulling outwardly upon said rod, the clutch 51 is disengaged from such auxiliary shaft, and at the same time the cluch 46 is forced into engagement with its opposite element 67 carried by the squirrel cage shaft 7.

In the operation of this device, the heat may be maintained at any desired temperature, but preferably between 150° for warming to 550° for broiling, or at any intermediate point such for example as at 350° for slow cooking. The squirrel cage may be manually rotated by means of the knob 12, in order to bring any desired circumferential portion of said squirrel cage to a forward position (when clutch 46—67 is disengaged) that is conveniently accessible to the operator, or it can be rotated by the motor at greatly reduced speed. To arrest the rotation of said squirrel cage by disengaging the clutch elements 46—67, the knob 61 is pushed inwardly, by which motion the clutch elements 51—21 are immediately engaged, if the former (51) is in alignment with one of the latter (21). If such alignment does not exist, rotation by means of said knob 12 may be continued manually for a short distance, either forwardly or rearwardly, when by virtue of the resiliency of the spring 65 said last mentioned clutch elements are seated, and only that one of said auxiliary shafts 14 in this specific position will continue to rotate under the power of said motor, as during a slack period when relatively few sausages or the like are in demand. When thus arresting rotation of the squirrel cage to continue rotation of such a single auxiliary shaft, alignment of said clutch elements may be obtained by manually rotating the cage in reverse direction, until such auxiliary shaft's disk 21 engages and is stopped by the gravity-actuated stop 66 (Fig. 13), that is pivotally supported at 67 and prevented from dropping below a certain predetermined position by means of a fixed pin or the like 68. During normal operation, and while each of the auxiliary shafts is revolving in its orbital path, its disk 21 meets and lifts the stop 66 and passes under it, after which said stop automatically drops into its lower or functioning position, as indicated by the broken lines in Fig. 13. However, immediately after reverse motion of the cage begins under manual manipulation, that one of said disks 21 whose shaft is being lifted by the cam surface 20 quickly engages said stop, and the indicated position (Figs. 11 and 13) is maintained until the knob 61 is again pulled outwardly, whereupon the clutch elements 51—21 are disengaged and the corresponding elements 46—67 are engaged, and the motor continues the normal operation of the squirrel cage revolving it in the usual manner, with all of the auxiliary shafts revolving about their respective axes and also about the axis of said cage. For more positive maintenance of the inward position of the clutch shaft 49 (as in Fig. 11), the manual rod 58 is provided with a notch 70, by means of which when the outer end of the rod 58 drops slightly, the adjacent portion of the plate 34 enters it, and said rod is thus secured as long as desired in that position in which the motor drives the single auxiliary shaft only.

Having thus described my invention, what I claim and desire to protect by Letters Patent of the United States is:

1. A broiler for sausages and the like, comprising a source of heat, a circular rack, rotatable supporting means for such sausage in normal engagement with said rack and revolvable about an axis common to that of said rack, a motor to drive said supporting means, to revolve sausage carried by said supporting means also about an auxiliary axis parallel with and spaced from and in a planetary orbit relative to the axis of said rack and to said heat source, means to automatically disengage each auxiliary supporting means from said rack throughout a portion of its normal orbital path, and means to drive said auxiliary support while free from engagement with said rack.

2. A broiler for sausages and the like, comprising a source of heat, a circular rack, rotatable supporting means for such sausage in normal engagement with said rack and revolvable about an axis common to that of said rack, a motor to drive said supporting means, to revolve sausage carried by said supporting means also about an auxiliary axis parallel with and spaced from and in a planetary orbit relative to the axis of said rack and to said heat source, means to automatically disengage each auxiliary supporting means from said rack throughout a portion of its normal orbital path, means to drive said auxiliary support while free from engagement with said rack, and a clutch to alternately connect and disconnect said auxiliary support from said driving means.

3. A broiler for sausages and the like, comprising a source of heat, a circular rack, rotatable supporting means for such sausage in normal engagement with said rack and revolvable about an axis common to that of said rack, a motor to drive said supporting means, to revolve sausage carried by said supporting means also about an auxiliary axis parallel with and spaced from and in a planetary orbit relative to the axis of said rack and to said heat source, means to automatically disengage each auxiliary supporting means from said rack throughout a portion of its normal orbital path, means to drive said auxiliary support while free from engagement with said rack, and clutch means to disconnect said supporting means from and connect said revolving means directly to said motor while said supporting means and said revolving means are free from engagement with each other.

4. A broiler for sausages and the like, comprising a source of heat, a circular rack, rotatable supporting means for such sausage in normal engagement with said rack and revolvable with respect to said heat source about an axis parallel with the axis of said rack, a motor to drive said supporting means, a plurality of auxiliary supporting means carried by said first mentioned supporting means and normally in engagement with said rack, means to automatically disengage selectively each of said auxiliary supporting means from said rack for independent rotation of such disengaged supporting means, and means to drive said auxiliary supporting means from said motor while free from engagement with said rack.

5. A broiler for sausages and the like, comprising a source of heat, a circular rack, rotatable supporting means for such sausage in normal engagement with said rack and revolvable with respect to said heat source about an axis parallel with the axis of said rack, a motor to drive said supporting means, a plurality of auxiliary supporting means carried by said first mentioned supporting means and normally in engagement with said rack, means to automatically disengage selectively each of said auxiliary supporting means from said rack for independent rotation of such disengaged supporting means, means to drive said auxiliary supporting means from said motor while free from engagement with said rack, and clutch means to disconnect said first supporting means from and to selectively connect said auxiliary supporting means directly to said motor while said first supporting means and said auxiliary supporting means are free from engagement with each other.

6. A broiler for sausages, comprising a source of heat, a circular rack, rotatable supporting means for such sausage in normal engagement with said rack and movable with respect to said heat source about an axis parallel with the axis of said rack, a motor to drive said supporting means, a plurality of auxiliary supporting means carried by said first mentioned supporting means and normally in engagement with said rack, a cam surface fixed with respect to said rack and operative to be periodically engaged by each of said auxiliary supporting means in sequence to temporarily disengage said auxiliary means from said rack, and clutch means to disconnect said first supporting means from and to selectively connect said auxiliary supporting means directly to said motor while said auxiliary means are disconnected from said rack.

7. A broiler for sausages, comprising a source of heat, a circular rack, a squirrel cage comprising end members and parallel independently revolvable rods connecting said members, a gear carried by each of said rods and normally engaging said rack, a motor to rotate said cage, and thereby revolve said rods and sausages carried thereby with respect to said heat source and in an orbital path about the axis of said rack, means to disengage each of said rods from said rack throughout a portion of its normal orbital path, and power transmitting means for selectively driving said rods directly from said motor while disengaged from said rack.

8. A broiler for sausages, comprising a source of heat, a circular rack, a squirrel cage comprising end members and parallel independently revolvable rods connecting said members, a gear carried by each of said rods and normally engaging said rack, a motor to rotate said cage and thereby revolve said rods and sausages carried thereby with respect to said heat source and in an orbital path about the axis of said rack, means to disengage each of said rods from said rack throughout a portion of its normal orbital path, and clutch means to selectively disconnect said cage as such from and connect said individual rods directly to said motor while said rods are free from engagement with said rack.

References Cited in the file of this patent

UNITED STATES PATENTS

| | | |
|---|---|---|
| 1,476,215 | Pace | Dec. 4, 1923 |
| 1,786,300 | Harrison | Dec. 23, 1930 |